United States Patent
Viskari et al.

(10) Patent No.: US 11,493,639 B2
(45) Date of Patent: Nov. 8, 2022

(54) A-GNSS POSITIONING IN WIRELESS MESH COMMUNICATION SYSTEM

(71) Applicant: WIREPAS OY, Tampere (FI)

(72) Inventors: Joonas Viskari, Lempaala (FI); Juho Pirskanen, Kangasala (FI); Mirva Saarijärvi, Turku (FI)

(73) Assignee: SAVONLINNAN PR-URAKOINTI OY, Savonlinna (FI)

( * ) Notice: Subject to any disclaimer, the term of this patent is extended or adjusted under 35 U.S.C. 154(b) by 307 days.

(21) Appl. No.: 16/823,712

(22) Filed: Mar. 19, 2020

(65) Prior Publication Data

US 2020/0309959 A1    Oct. 1, 2020

(30) Foreign Application Priority Data

Mar. 29, 2019 (FI) .................................. 20195248

(51) Int. Cl.
| | | |
|---|---|---|
| *G01S 19/25* | (2010.01) | |
| *H04W 84/18* | (2009.01) | |

(52) U.S. Cl.
CPC ............. *G01S 19/25* (2013.01); *H04W 84/18* (2013.01)

(58) Field of Classification Search
CPC ................................ G01S 19/25; H04W 84/18
USPC .................................................. 342/357.64
See application file for complete search history.

(56) References Cited

U.S. PATENT DOCUMENTS

| | | | | |
|---|---|---|---|---|
| 7,656,311 | B2* | 2/2010 | Holmes | G08G 1/127 340/988 |
| 8,798,908 | B2* | 8/2014 | Bourdeaut | H04W 64/00 701/472 |
| 2003/0083816 | A1* | 5/2003 | Imakado | G01S 19/05 342/357.66 |
| 2007/0247361 | A1* | 10/2007 | Shoarinejad | G01S 19/074 342/357.44 |
| 2011/0205110 | A1 | 8/2011 | Abraham et al. | |
| 2012/0116677 | A1 | 5/2012 | Higgison et al. | |

(Continued)

FOREIGN PATENT DOCUMENTS

| | | | | |
|---|---|---|---|---|
| WO | WO-2009026189 A2 * | 2/2009 | ............. | G01S 19/05 |
| WO | 2009138555 A1 | 11/2009 | | |

(Continued)

OTHER PUBLICATIONS

Finnish Search Report for 20195248 dated Oct. 23, 2019.
European Search Report for European Application 20163039 dated Aug. 11, 2020.

*Primary Examiner* — Harry K Liu
(74) *Attorney, Agent, or Firm* — Thomas | Horstemeyer, LLP

(57) ABSTRACT

The application relates to a wireless mesh communication system (100) that comprises a plurality of radio nodes (102, 104, 106). Each of the plurality of radio nodes is configured to provide a bi-directional radio communication with other radio node (102, 104, 106) of the system and to obtain (213, 216, 224) an assisted GNSS (A-GNSS) assistance data used in a global navigation satellite system (GNSS) positioning. Also, at least one (102, 104) of the radio nodes indicates (230) to other radio nodes (102, 104, 106) of the system that the A-GNSS assistance data is available and transmissible on request, if the at least one of the radio nodes has this A-GNSS assistance data.

14 Claims, 2 Drawing Sheets

(56) References Cited

U.S. PATENT DOCUMENTS

2013/0237252 A1     9/2013    Wirola et al.
2014/0342662 A1    11/2014    Das

FOREIGN PATENT DOCUMENTS

WO          2010052496 A1     5/2010
WO     WO-2013025166 A1 *   2/2013   ........... H04W 36/32

* cited by examiner

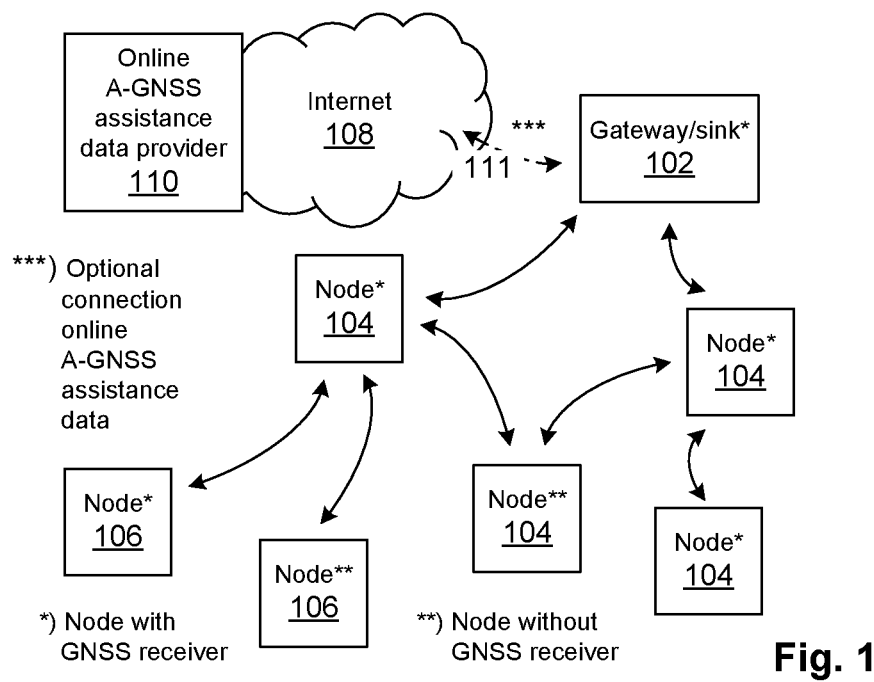
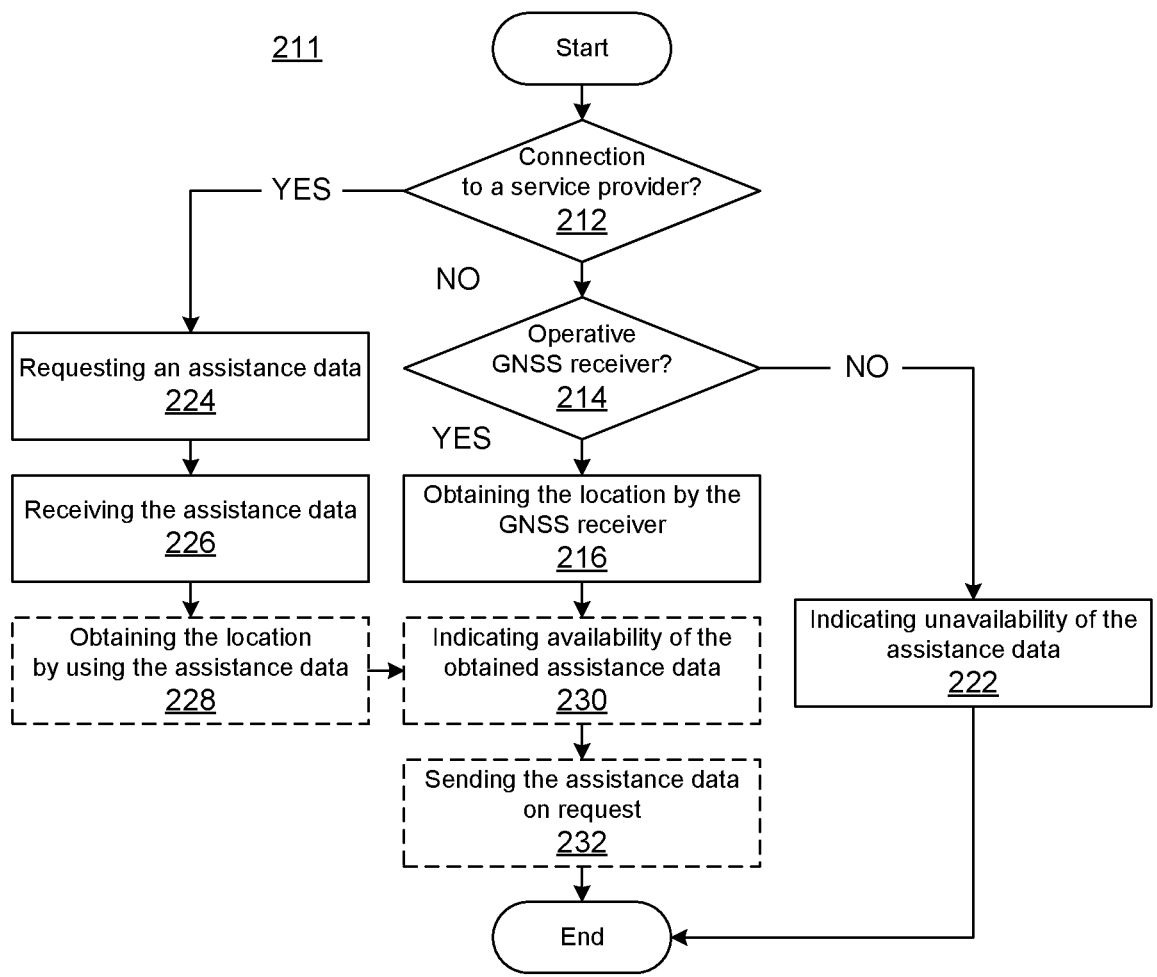
Fig. 1
Fig. 2a

A-GNSS POSITIONING IN WIRELESS MESH COMMUNICATION SYSTEM

CROSS-REFERENCE TO RELATED APPLICATIONS

This application claims priority to, and the benefit of, Finnish application having serial no. 20195248, filed Mar. 29, 2019, the contents of which are incorporated by reference in their entirety.

TECHNICAL FIELD

The application relates generally to an Assisted Global Navigation Satellite System (A-GNSS) positioning in a wireless meh communication system.

BACKGROUND

All Global Navigation Satellite System (GNSS) positioning methods, i.e. the Global Positioning System (GPS), Galileo, Glonass, and Beidou-2, are based on the known location of GNSS satellites and accurate time keeping. When this information is used, a position of device performing positioning is triangulated based on a measured and calculated distance of the GNSS satellites at given time.

Satellite positions can be calculated using the time and known track parameters. Short-term accurate track parameters are called as ephemeris, which are valid four hours, and long-term track parameters called as almanacs.

Ephemerides and almanacs can be received from the satellites, but it may take tens of minutes to obtain the full set of parameters from single satellite. E.g., the duration of GPS navigation message is 12.5 minutes after which it is repeated. The GPS navigation message consists of six second-long subframes and several pages, which are repeated every 30 seconds. Because of this decoding, the Time of Week (TOW) may take up to 12 seconds and the GPS Week in average 45 seconds. Satellite signal levels may be just above data decoding threshold level and it is needed several attempts before ephemeris can be decoded successfully.

To be able to triangulate a user position, a distance to at least three satellites are needed for a two-dimensional (2D) position. A three-dimensional (3D) position requires knowing a distance to at least four satellites and, when it is needed better accuracy, it requires measurements from a higher number of satellite positions.

However, it is possible to obtain a position fix in optimal conditions within one second. The requirements for this are an estimate of current user position called Last Good Fix (LGF), time (GPS Week and TOW), and satellite locations (ephemeris and almanac of multiple satellites).

A first challenge is to get time that is used to validate ephemerides and almanacs. E.g., the ephemeris is valid up to 4 hours and the almanacs 30 days in the GPS. It is possible to calculate the doppler shifts for visible satellites by using this information and more accurate that information is, more accurate the search parameters for the radio are and faster the satellite acquisition process is. The 3D position fix can be calculated when at least four satellites are acquired and in track.

Due to this, if the GNSS positioning starts without any known information about the user location, ephemerides, almanacs, or current time, it may take in worst case tens of minutes to acquire enough satellites in track and to calculate the position fix.

So, the A-GNSS positioning was developed to overcome the performance issues and it is widely used in cell phones today. The A-GNSS means that time and satellite information, i.e. an assistance data that includes the ephemerides, almanacs, LGF (available at a device performing positioning), and time, is injected to a GNSS receiver and that way the position fix can be acquired within couple of seconds.

In cell phones, A-GNSS real-time information can usually be downloaded over a data connection from a remote server as application data or it is provided by mobile network as control plane signalling to a single cell phone.

SUMMARY

One object of the invention is to withdraw the drawbacks of known solutions and to present an efficient A-GNSS positioning in a wireless mesh communication system, wherein an A-GNSS assistance data is obtained in a single radio node by means of a GNSS fix or from online Internet provider, and used, managed, and distributed locally. This reduces significantly a system load, which is caused by the distribution of A-GNSS assistance data.

One object of the invention is fulfilled by providing the communication system, positioning methods, radio node device, computer program, and computer-readable medium according to the independent claims.

One embodiment is a wireless mesh communication system that comprises a plurality of radio nodes. Each of the plurality of radio nodes is configured to provide a bi-directional radio communication with other radio node of the system and to obtain an A-GNSS assistance data used in a GNSS positioning. Also, at least one of the radio nodes indicates to other radio nodes of the system that the A-GNSS assistance data is available and transmissible on request, if the at least one of the radio nodes has this A-GNSS assistance data.

One embodiment is an A-GNSS positioning method in the wireless mesh communication system, which is in accordance with the above-mentioned system embodiment. The method comprises a step of indicating, by at least one radio node of the system, to other radio nodes of the system that the A-GNSS assistance data is available and transmissible on request, if the at least one radio node has this A-GNSS assistance data.

One embodiment is a radio node device for a wireless mesh communication system that comprises a processor part and a data transfer part. The node device is configured to provide, by the data transfer part, a bi-directional radio communication with at least one another radio node device and to obtain an A-GNSS assistance data used in a GNSS positioning. The node device also indicates, by the data transfer part, to other radio nodes of the system that the A-GNSS assistance data is available and transmissible on request, if the node device has this A-GNSS assistance data.

One embodiment is an A-GNSS positioning method for the radio node device, which is in accordance with the above-mentioned node device embodiment, in a wireless mesh communication system. The method comprises a step of indicating, by the data transfer part of the node device, to other radio node devices of the system that an A-GNSS assistance data is available and transmissible on request, if the node device has this A-GNSS assistance data.

One embodiment is a computer program that instructions which, when the program is executed by a radio node device, cause the node device to carry out the step of the above-mentioned, previous positioning method. This program comprises code for indicating, by the data transfer part of the node device, to other radio node devices of the wireless mesh communication system that an A-GNSS assistance data is available and transmissible on request, if the node device has this A-GNSS assistance data.

One embodiment is a non-statutory tangible computer readable medium that comprises the computer program, which is in accordance with the above-mentioned program embodiment.

Further embodiments are disclosed in the dependent claims.

BRIEF DESCRIPTION OF THE FIGURES

The embodiments are presented with reference to the accompanying figures:

FIG. 1 presents a wireless mesh communication system

FIG. 2a presents how a sink node operates in the system

DETAILED DESCRIPTION OF THE FIGURES

Figure 2B:
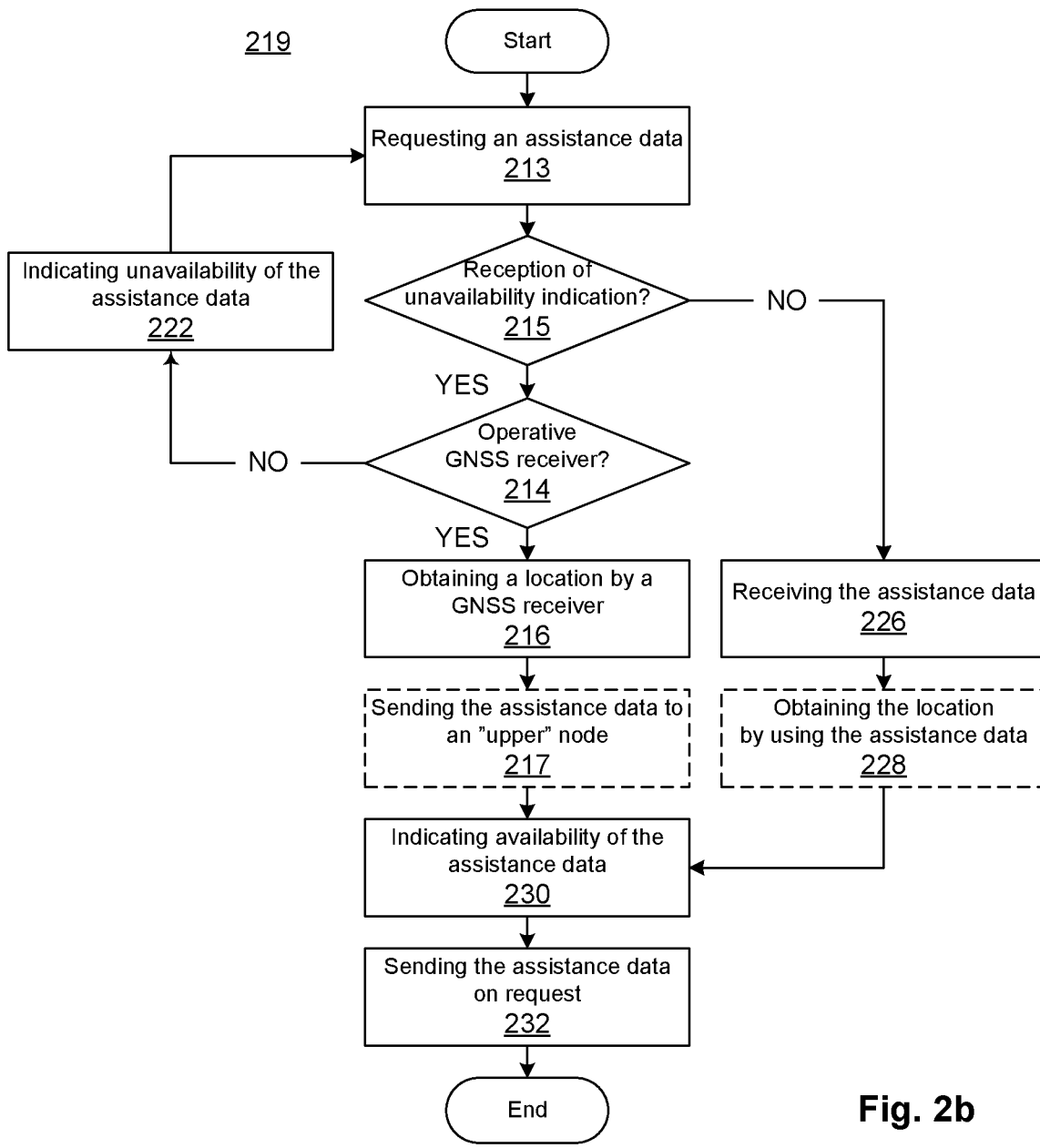
FIG. 2b presents how router and non-router nodes operate in the system

FIG. 1 presents an example of a wireless mesh communication system (wireless mesh network, WMN) 100, which is e.g. a wireless sensor network (WSN) or a wireless user (end) device network.

The wireless communication in the system 100 is based on e.g. Bluetooth Low Energy (BLE), IEEE 802.15 standard, IEEE 802.11 standard, or other radio protocol.

The system 100 comprises a plurality of radio nodes 102, 104, 106. The plurality of nodes 102, 104, 106 are able to operate in different roles.

The system 100 comprises at least one node operating in a sink role 102, i.e. it is part of gateway to other networks 108, e.g. Internet, and delivering data in and from the system 100. The rest of the nodes 104, 106 of the plurality of nodes 102, 104, 106 are divided into router nodes 104 and non-router nodes 106 depending on if they need to participate in data forwarding.

The operation as a router node 104 comprises capability for bi-rectional communication, which means that it comprises capability for receiving data from at least one other node 102, 104, 106, e.g. one, two, three, or more nodes 102, 104, 106, and transmitting the received data to at least one other node 102, 104, 106, e.g. one, two, three, or more nodes 102, 104, 106. Each router node 104 maintains a connectivity of the system 100 and forwards data of other nodes 102, 106 when needed.

Each non-router node 106 transmits its own data and receives data directed for it, i.e. it is capable of bi-directional communication similarly as a sink and router nodes 102, 104, but typically it does not route data of other nodes 102, 104.

Each of the plurality of nodes 102, 104, 106 of the system 100 is able to operate at least as a router node 104 or as a non-router node 106.

Typically, the system 100 is such that all nodes 104, 106 cannot communicate directly with the sink node 102 due to extensive distance between nodes 102, 104, 106, and limited radio range, whereupon it is needed multi-link (multi-hop) communication between a node 104, 106, and the sink node 102.

FIG. 1 presents the system 100, where one part of the radio nodes 102, 104, 106 has a GNSS receiver 356 in each radio node 102, 104, 106 and another part that lacks such GNS receiver 356.

Alternatively, the system 100 may be such that all radio nodes 102, 104, 106 have the GNSS receiver 356 or all radio nodes 102, 104, 106 are without the GNSS receiver 356.

Each of the radio nodes 102, 104, 106 is provided with a Mesh A-GNSS Data Service (MADS) application (computer program, software, functionality) 357, which enables a radio node 102, 104, 106 to obtain a A-GNSS assistance data, to keep a local copy of the A-GNSS assistance data fresh in the radio node 102, 104, 106, to distribute the A-GNSS assistance data locally, to indicate an availability of the A-GNSS assistance data, and to provide the A-GNSS assistance data on request for the system 100.

The MADS functionality in a radio node 102, 104, 106 obtains the A-GNSS assistance data from the radio node's 102, 104, 106 own GNSS receiver 356 or by mesh radio communication from other radio nodes 102, 104, 106. When the A-GNSS assistance is obtained, the MADS provides the A-GNSS assistance data to its own GNSS receiver 356. Additionally, the A-GNSS assistance data is available for distributing it forward in the system 100. The MADS functionality can also be in available at radio nodes 102, 104, 106 that do not have the GNSS receiver 356 at all. In such case, these radio nodes 102, 104, 106 provide the A-GNSS assistance data to other neighbouring radio nodes 102, 104, 106 for use or further distribution.

The radio node 102, 104, 106 that has the GNSS receiver 356 is capable of obtaining its location by performing a GNSS positioning using an A-GNSS assistance data and, also, obtaining its location by performing the GNSS positioning using the GNSS receiver 356 without the A-GNSS assistance data.

The radio node 102, 104, 106 that has the GNSS receiver 356 is also capable of obtaining the A-GNSS assistance data as a result of the GNSS positioning using the GNSS receiver 356 and by receiving the A-GNSS assistance data sent by another radio node 102, 104, 106.

The radio node 104, 106 that lacks the GNSS receiver 356, whereupon it is unable to perform the GNSS positioning, is capable of obtaining its location by performing a received signal strength indication (RSSI)-based positioning by means of positioning messages from other radio nodes 102, 104, 106 of the system 100.

The radio nodes 102, 104, 106 with a A-GNSS location transmit a positioning message, e.g. a cluster beacon, for the RSSI-based positioning where the radio nodes 102, 104, 106 perform a RSSI measurement. When the radio nodes 102, 104, 106 with the GNSS receiver 356 are not necessary installed permanently in a fixed location, these radio nodes 102, 104, 106 transmit also the location of their own, obtained by the GNSS positioning, and time when that fix was obtained. The radio nodes 102, 104, 106, which are with a known fixed location, can indicate that the location is known and fixed, and possibly the location, but not necessarily.

This enables the radio nodes 104, 106 without the GNSS receiver 356 to perform the RSSI positioning locally without necessity to communicate the position to a backend system. Additionally, the radio nodes 104, 106 without the GNSS receiver 356 can weight measurement results from the radio nodes 102, 104, 106 with the GNSS receiver 356 having the latest fix time or fixed installation more compared to measurement results obtained from the radio nodes 102, 104, 106 with the GNSS receiver 356 that have very an old GNSS location estimation.

Alternatively, the radio node 104, 106 that lacks the GNSS receiver 356 may obtain its location by performing an angle of arrival (AoA) and an angle of departure (AoD)-based or a time of arrival (ToA)-based positioning.

When the radio node 102, 104, 106 can obtain its location by the GNSS receiver 356, it enables solutions, e.g. moving or temporary asset tracking solutions, where the location of radio node 102, 104, 106 can be non-fixed and it is not necessary to enter that location to a backend system. Thus, when the GNSS-based absolute locations of moving radio nodes 102, 104, 108 are known, relative locations of assets are tracked using radio signal-based positioning methods, e.g. RSSI, AoA, AoD, or TOA methods.

The system 100 further comprise an online A-GNSS assistance data provider (A-GNSS server) 110 to which each sink node 102 may have an external connection 111 through the network 108. The assistance data provider 110 obtains the A-GNSS assistance data and distributes it through the connection 111, if such exists.

When the A-GNSS assistance data is available from an Internet server, it may be used in applications that favour speed over energy or cost efficiency. For extremely cost and energy efficient applications, the system 100 obtains and distributes the A-GNSS assistance data using local resources.

The sink node 102, irrespective of having the GNSS receiver 356 or not, is capable of obtaining the A-GNSS assistance data from the assistance data provider 108 through an external connection 109, if such exists temporarily or permanently.

Irrespective of having the GNSS receiver 356 or not, all radio nodes 102, 104, 106 are capable of distributing the A-GNSS assistance data on request, indicating (advertising) an availability of the A-GNSS assistance data, if a radio node 102, 104, 106 has such data, and indicating an unavailability of the A-GNSS assistance data, if the radio node 102, 104, 106 does not have such data.

The system 100 supports high number of A-GNSS enabled radio nodes 102, 104, 106, and enables to use connected A-GNSS services and devices that mus be low powered.

FIG. 2a presents an operation of sink node 102 in the system 100, and how it obtains and distributes an A-GNSS assistance data.

At step 212, the sink node 102 determines whether it has the external connection 111 to the assistance data provider 110.

At step 214, when the sink node 102 is aware of that there is no such connection 111, which may be permanent, i.e. such is not configured, or temporary condition, and it is aware of having an operative GNSS receiver 356 and sufficient signal conditions, it initiates an acquisition of its location by using the A-GNSS receiver 356. If temporarily non-existing connection 111 to the assistance data provider 110 is restored, the sink node 102 may then request the A-GNSS assistance data and perform operations in accordance with steps 224, 226, 228, 230, and 232 as below are described.

At step 216, the sink node 102 obtains its location by means of the GNSS receiver 356. The sink node 102 is typically mains powered or it has significantly bigger battery than other radio nodes 104, 106, whereupon it is beneficial that the sink node 102 obtains its location fix blindly rather than other radio nodes 104, 106. This positioning results, of course the location of sink node 102, but also an A-GNSS assistance data as part of acquisition of location fix, which other radio nodes 104, 106 can utilize when obtaining locations without the use of GNSS receivers 356.

At step 230, when the sink node 102 has the obtained A-GNSS assistance data, it may indicate an availability of A-GNSS assistance data and that the A-GNSS assistance data is sent on request to other radio nodes 104, 106 of the system 100 by broadcasting an availability indication to the system 100.

At step 232, if the availability indication has been broadcasted and some of the radio nodes 104, 106 requests the A-GNSS assistance data from the sink node 102 by means of an A-GNSS assistance data request, it responds by sending the requested A-GNSS assistance data to this radio node 104, 106. Finally, the sink node 102 ensures that it constantly has a valid A-GNSS assistance data available and reinitiates the process for acquiring updated A-GNSS assistance data before it becomes invalid.

At step 214, when there is no connection 111 permanently or temporarily, and the sink node 102 lacks the operative GNSS receiver 356 or sufficient signal conditions so that it is unable to obtain its location fix blindly, it initiates to inform the system 100 that the A-GNSS assistance data is unavailable.

At step 222, the sink node 102 indicates an unavailability of A-GNSS assistance data to other radio nodes 104, 106 of the system 100 by broadcasting an unavailability indication to the system 100. If some of the radio nodes 104, 106 requests the A-GNSS assistance data from the sink node 102 by means of the A-GNSS assistance data request, it responds by sending this unavailability indication to the radio node 104, 106. If the sink node 102 has the operative GNSS receiver 356 and temporarily poor signal conditions are restored, the sink node 102 may then obtain its location and perform the operations in accordance with steps 216, 230, and 232 as above has been described.

At steps 222 and 232, the sink node 102 performs the broadcast of unavailability and availability indications by e.g. network or cluster beacons.

At step 224, when the sink node 102 is aware of that there is the connection 111 to the assistance data provider 110, it sends an A-GNSS assistance data request to the assistance data provider 110.

At step 226, the assistance data provider 110 send the requested A-GNSS assistance data and the sink node 102 receives it.

At step 228, the sink node 102 may obtain its location by means of the received A-GNSS assistance data, but not necessarily, because its location may be fixed and already known. Then, irrespective of how the sink node 102 has obtained its location, it may perform the operations of steps 230 and 232 similarly as described above.

FIG. 2b presents an operation of GNSS receiver 356 equipped router or non-router node 104, 106 in the system 100, and how it obtains and distributes the A-GNSS assistance data.

The radio node 104, 106 is a power-optimized radio node, which performs the positioning and acquisition of A-GNSS assistance data only when there is positioning request from its MADS application. Alternatively, the radio node 104, 106 is a positioning-performance-optimized node, which performs the acquisition of A-GNSS assistance data in advance and performs the positioning so that it is immediately available when the MADS application requires such data.

The radio node 104, 106 also obtains and maintains the A-GNSS assistance data locally so that its distribution is possible. This can be done e.g. when the radio node 104 operates as a router node. When the radio node 104 that is a router and that provides the A-GNSS assistance data, and a requesting radio node 104, 106 are members of a same cluster, it reduces the amount of participating radio nodes 104, 106, which, in turn, means more energy efficiency and less radio usage.

At step 213, when the radio node 104, 106 starts its positioning process, it sends the A-GNSS assistance data request to its sink node 102 or router node 104.

At step 215, if the radio node 104, 106 receives the unavailability indication from the sink or router node 102, 104, which indicates that the sink or router node 102, 104 has no A-GNSS assistance data, and, similarly as at step 214 in the process of FIG. 2a, it is aware of having the operative GNSS receiver 356, it initiates the acquisition of its location by using the GNSS receiver 356.

At step 216, similarly as in the process of FIG. 2a, the radio node 104, 106 obtains its location by means of its own GNSS receiver 356. This positioning results the location of radio node 104, 106 and the A-GNSS assistance data as part of acquisition of blind location fix.

At step 217, when the positioning has been performed, the radio node 104, 106 may send, but not necessarily, the obtained A-GNSS assistance data to the sink or router node 102, 104 that indicated the lack of A-GNSS assistance data at step 215.

The transmission of A-GNSS assistance data enables to distribute the A-GNSS assistance data in the system 100 to any other radio node 102, 104, 106 in order to avoid the case where other radio node 102, 104, 106 would need to perform the positioning blindly. The radio node 104 in the router role can send the A-GNSS assistance data to further in an uplink tree of the system 100 so that it receives the sink node 102. Then, the sink node 102 can reply with the valid A-GNSS assistance data to all assistance data requests received from the system 100.

At step 230, when the radio node 104, 106 has the obtained A-GNSS assistance data, and it possibly has sent it to the the sink or router node 102, 104 at step 217, it indicates the availability of A-GNSS assistance data and that the A-GNSS assistance data is sent on request to other radio nodes 104, 106 by broadcasting the availability indication to the system 100.

At step 232, if the availability indication has been broadcasted and some of the radio nodes 104, 106 requests the A-GNSS assistance data from the radio node 104, 106 by means of the A-GNSS assistance data request, it responds by sending the requested A-GNSS assistance data to the radio node 104, 106 sending the request.

At step 226, if the radio node 104, 106 does not receive the unavailability indication from the sink or router node 102, 104 at step 215, it receives the requested A-GNSS assistance data from the sink or router node 102, 104.

At step 228, the radio node 104, 106 obtains its location by means of the received A-GNSS assistance data and its GNSS receiver 356. Then, after the radio node 104, 106 has obtained its location, it may perform the operations of steps 230 and 232, if the radio node 104, 106 is in a router role, similarly as described above when the acquisition of location has been performed blindly.

Similarly, as the sink node 102 in the process of FIG. 2a, the radio node 104, which operates as a router, ensures that when it indicates the availability of the valid A-GNSS assistance data in broadcast at step 230, it can re-initiate the process for acquiring an updated A-GNSS assistance data before the A-GNSS assistance data becomes invalid. Additionally, the radio node 104 can perform new location acquisitions when it has received positioning request from its MADS application. This ensures that the A-GNSS assistance data remains valid.

If the radio node 104, which operates as a router, receives the A-GNSS assistance data request from other radio node 104, 106, when it has no A-GNSS assistance data, it sends the A-GNSS assistance data request to a next hop towards the sink node 102 in a routing tree of the system 100 similarly as described above at step 213.

If the radio node 104 receives the A-GNSS assistance data from the "upper" link of system 100, it forwards the A-GNSS assistance data, and optionally its own position and LGF time to the requesting radio node 104, 106. Thus, the requesting radio node 104, 106, which receives the A-GNSS assistance data and last position of at least one other radio node 104, can use the position of at least one other node 104 as LGF location and fix time as the LGF together. This improves the GNSS time to fix of radio nodes 104, 106, especially, when there has not been previous fix or time since the last fix is long or the location of the requesting radio node 104, 106 has changed significantly.

After the forwarding of at least the A-GNSS assistance data, the radio node 104 starts indicating the availability of the A-GNSS assistance data in the system 100 similarly as described above at step 230.

If the radio node 104 has not received the A-GNSS assistance data but it receives the unavailability indication, the radio node 104 may start the operation to obtain the blind location similarly as described above at steps 215, 216. Alternatively, if the radio node 104 does not perform the positioning, it sends the unavailability indication to the requesting radio node 104, 106.

A router or non-router node 104, 106 that lacks the GNSS receiver 356 or that has a non-operative GNSS receiver 356, operates at steps 213, 215 similarly as the operative GNSS receiver 356 equipped radio node 104, 106 as described above in the process of FIG. 2b except when the radio node 104, 106 receives the unavailability indication from the sink or router node 102, 104 at step 215. In that case, the radio node 104, 106 initiates the unavailability indication.

At step 222, the radio node 104, 106 indicates the unavailability of A-GNSS assistance data to other radio nodes 104, 106 similarly as described in the process of FIG. 2a. Again, if some of the other nodes 104, 106 requests the A-GNSS assistance data from the radio node 104, 106 by means of the A-GNSS assistance data request, it sends the unavailability indication to this requesting radio node 104, 106.

At step 213, the radio node 104, 106 returns to send the A-GNSS assistance data request to its sink node 102 or router node 104. The process of steps 213, 215, 214, 222 continues as long as the radio node 104, 106 does not receive the unavailability indication from the sink or router node 102, 104 at step 215, whereupon it performs the operations of steps 226, 230, 232 similarly as described above. Alternatively, if the radio node 104, 106 has the GNSS receiver 356, which turns out to be operative at step 214, it performs the operations of steps 216, 230, 232, and possibly the operation of step 217, similarly as described above.

Figure 3:
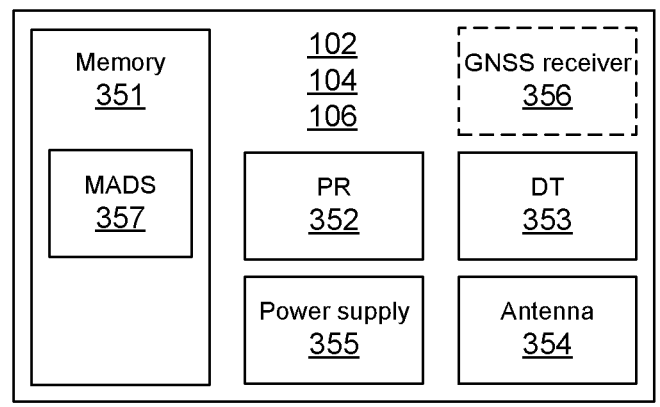
FIG. 3 presents a hardware architecture of used radio node

FIG. 3 presents an example of a radio node device (apparatus) 102, 104, 106.

The radio node 102, 104, 106 is a mesh-enabled radio node device, whereupon it is e.g. a sink node 102, router node 104, or a non-router node 106.

The radio device 102, 104, 106 comprises a processor part 352 that performs user and/or computer program (software) initiated instructions, and to process data in order to run an application and communication protocol. The processor part 532 may comprise at least one processor, e.g. one, two, or three processors.

The radio node 102, 104, 106 also comprises a memory part 351 in order to store and to maintain data. The data may be instructions, computer programs, and data files. The memory part 351 may comprise at least one memory, e.g. one, two, or three memories.

The radio node 102, 104, 106 also comprises a data transfer part 356 and an antenna part 354. The radio node 102, 104, 106 uses the data transfer part 353 in order to send commands, requests, and data to at least one of other radio node devices 102, 104, 106 of the system 100 via the antenna part 354. The data transfer part 353 also receives commands, requests, and data from at least one of the other radio nodes 102, 104, 106 via the antenna part 354 in the system 100.

The radio node 102, 104, 106 also comprises a power supply part 355. The power supply part 355 comprises components for powering the radio node 102, 104, 106, e.g. a battery and a regulator.

The radio node 102, 104, 106 may comprise a GNSS receiver 356 in order to perform the GNSS positioning by using the A-GNSS assistance data, and to perform the GNSS positioning without the A-GNSS assistance data, which provides, as a result of the positioning, the A-GNSS assistance data.

The memory part 351 comprises a data transfer application for operating (controlling) the data transfer part 353, an antenna application for operating the antenna part 354, a power supply application for operating the power supply part 355, and a GNSS receiver application for operating the GNSS receiver 356, if the radio node 102, 104, 106 has the GNSS receiver 356.

The memory part 351 also comprises the MADS application 357, which is configured to use at least one of parts 353, 354, 355, 356 in order to perform at least the operations of the radio node 102, 104, 106 described above in this description part and figures, when it is run in a computer, e.g. in the radio node 102, 104, 106 by means of the processor part 352.

The invention claimed is:

1. A wireless mesh communication system comprising:
    a plurality of radio nodes;
    wherein each of the plurality of radio nodes is configured to provide a bi-directional radio communication with other radio node of the system and to obtain an assisted GNSS (A-GNSS) assistance data used in a global navigation satellite system (GNSS) positioning, and
    wherein at least one of the radio nodes sends an indication to other radio nodes of the system that the A-GNSS assistance data is available and transmissible on request, if the at least one of the radio nodes has this A-GNSS assistance data.

2. The system according to claim 1, wherein a first radio node belonging to the plurality of radio nodes obtains its location by means of its GNSS receiver without the A-GNSS assistance data, if the first radio node lacks the A-GNSS assistance data and it is not available from a second radio node belonging to the plurality of radio nodes, whereupon this positioning results an A-GNSS assistance data obtained by the first radio node.

3. The system according to claim 2, wherein the first radio node sends the A-GNSS assistance data to at least the second radio node, which lacks the A-GNSS assistance data.

4. The system according to claim 1, wherein each of the plurality of radio nodes having the A-GNSS assistance data broadcasts an availability indication that indicates an availability of the A-GNSS assistance data and that the A-GNSS assistance data is sent on request.

5. The system according to claim 1, wherein each of the plurality of radio nodes sends an unavailable response indication, which indicates that it lacks the A-GNSS assistance data, to an A-GNSS assistance data request, if it lacks the A-GNSS assistance data.

6. The system according to claim 2, wherein the first radio node sends the A-GNSS assistance data on request to a third radio node belonging to the plurality of radio nodes, which also is configured to provide the bi-directional radio communication and to obtain the A-GNSS assistance data, if the second radio node has the A-GNSS assistance data.

7. The system according to claim 2, wherein the first radio node sends an A-GNSS assistance data request towards the second radio node, which operates as a sink radio node of the system, if the first radio node lacks the A-GNSS assistance data.

8. The system according to claim 7, wherein the first radio node sends the A-GNSS assistance data request, if it has received the A-GNSS assistance data request from other radio node belonging to the plurality of radio nodes.

9. The system according to claim 2, wherein the second radio node obtains the A-GNSS assistance data from an A-GNSS assistance data provider of the system or, if it is temporarily or permanently impossible, the second radio node obtains the A-GNSS assistance data by obtaining its location by means of its GNSS receiver without the A-GNSS assistance data.

10. The system according to claim 1, wherein the first or second radio node sends a positioning message to a fourth radio node belonging to the plurality of radio nodes, which also is configured to provide the bi-directional radio communication, but lacks a capability to perform GNSS positioning, whereupon the fourth radio node is able to perform a received signal strength indication (RSSI)-based positioning by means of positioning messages from other radio nodes of the system.

11. An A-GNSS positioning method in the wireless mesh communication system according to any of the preceding claim, comprising a step of:
    sending, by at least one radio node of the system, an indication to other radio nodes of the system that the A-GNSS assistance data is available and transmissible on request, if the at least one radio node has this A-GNSS assistance data.

12. A radio node device for a wireless mesh communication system, comprising
    a processor part and
    a data transfer part,
    which radio node device is configured
    to provide, by the data transfer part, a bi-directional radio communication with at least one another radio node device and to obtain an A-GNSS assistance data used in a GNSS positioning,
    wherein the radio node device is further configured to send, by the data transfer part, an indication to other radio nodes of the system that the A-GNSS assistance data is available and transmissible on request, if the radio node device has this A-GNSS assistance data.

13. An A-GNSS positioning method for the radio node device according to claim 12 in a wireless mesh communication system, comprising a step of
    indicating sending, by the data transfer part of the radio node device, an indication to other radio node devices of the system that the A-GNSS assistance data is available and transmissible on request, if the radio node device has this A-GNSS assistance data.

14. A non-transitory computer readable medium embodying a program comprising instructions which, when the program is executed by a radio node device, cause the radio node device to carry out at least the step of the method according to claim 13.

\* \* \* \* \*

UNITED STATES PATENT AND TRADEMARK OFFICE
CERTIFICATE OF CORRECTION

| | |
|---|---|
| PATENT NO. | : 11,493,639 B2 |
| APPLICATION NO. | : 16/823712 |
| DATED | : November 8, 2022 |
| INVENTOR(S) | : Joonas Viskari et al. |

It is certified that error appears in the above-identified patent and that said Letters Patent is hereby corrected as shown below:

On the Title Page

Item (73) Assignee: Delete the Assignee "SAVONLINNAN PR-URAKOINTI OY, Savonlinna (FI)" and add the Assignee --WIREPAS OY, Tampere (FI)--

Signed and Sealed this
Twenty-fourth Day of October, 2023

Katherine Kelly Vidal
*Director of the United States Patent and Trademark Office*